United States Patent
Keller et al.

(10) Patent No.: US 9,875,624 B2
(45) Date of Patent: Jan. 23, 2018

(54) NOTIFICATION DEVICE WITH NON-UNIFORM LED STROBE LIGHT PULSE SHAPING CONTROL AND METHODS

(71) Applicant: COOPER TECHNOLOGIES COMPANY, Houston, TX (US)

(72) Inventors: Jospeh Rudy Keller, Eatontown, NJ (US); Elliott J. Onstine, Bradenton, FL (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 0 days.

(21) Appl. No.: 15/051,017

(22) Filed: Feb. 23, 2016

(65) Prior Publication Data
US 2017/0243450 A1  Aug. 24, 2017

(51) Int. Cl.
G08B 5/38 (2006.01)
H05B 33/08 (2006.01)

(52) U.S. Cl.
CPC .......... *G08B 5/38* (2013.01); *H05B 33/0803* (2013.01); *H05B 33/0845* (2013.01)

(58) Field of Classification Search
CPC ............ H05B 33/0803; H05B 33/0806; H05B 33/0818; H05B 33/0833; H05B 33/0142; H05B 33/0845; G08B 5/00; G08B 5/38; G08B 5/002; G08B 5/36; G05B 5/002; G06B 5/36; B60Q 1/46; B60Q 1/4444
See application file for complete search history.

(56) References Cited

U.S. PATENT DOCUMENTS

| | | | | |
|---|---|---|---|---|
| 3,740,570 A | * | 6/1973 | Kaelin | H04N 9/30 307/40 |
| 6,515,584 B2 | * | 2/2003 | DeYoung | B60Q 1/46 340/468 |
| 7,573,446 B2 | * | 8/2009 | Kawaguchi | H05B 33/0803 345/204 |
| 7,663,500 B2 | | 2/2010 | Curran et al. | |
| 8,465,170 B2 | | 6/2013 | Rong et al. | |
| 2005/0099286 A1 | * | 5/2005 | DeYoung | B60Q 1/46 340/468 |
| 2009/0079357 A1 | * | 3/2009 | Shteynberg | H05B 33/0818 315/291 |
| 2013/0335229 A1 | * | 12/2013 | Savage, Jr. | G08B 5/38 340/577 |
| 2016/0174317 A1 | * | 6/2016 | Barnett | G09G 3/3413 315/210 |

\* cited by examiner

*Primary Examiner* — Van Trieu
(74) *Attorney, Agent, or Firm* — Armstrong Teasdale LLP

(57) ABSTRACT

A light emitting diode (LED) device includes a control circuit configured to apply a non-uniform output power pulse shape to increase illumination intensity in at least a part of the pulse without consuming additional power. Different intensity levels may be provided in series in the non-uniform output power pulse shape. The non-uniform output power pulse shape improves lighting while maintaining the same power consumption as a reference light pulse having a uniform shape.

17 Claims, 3 Drawing Sheets

NOTIFICATION DEVICE WITH NON-UNIFORM LED STROBE LIGHT PULSE SHAPING CONTROL AND METHODS

BACKGROUND OF THE INVENTION

The field of the invention relates generally to a notification device including a light emitting diode (LED) strobe, and more specifically to an LED notification strobe device for use in emergency life safety applications.

Life safety systems, including but not limited to fire alarm systems, typically include a number of notification devices positioned on walls and ceilings of a premises in accordance with applicable laws and regulations. Such notification devices may be configured to provide an audible alert and/or a visual alert to a person in the vicinity in the case of an emergency. A secondary optic element including but not limited to a total internal reflection (TIR) lens and/or a reflector may be provided to enhance the lighting effect.

Modern notification devices may include LED strobe lights to provide effective illumination of a strobe in relation to a life safety application such as a fire alarm or other signaling device. LED strobe lights are favored due to their efficiency and reduced amount of power consumption relative to conventional light sources using incandescent bulbs.

While existing LED notification devices have been well received in the marketplace for emergency lighting purposes, further improvements in efficiency of LED notification devices are desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

In life safety systems such as fire safety warning systems, the light output of an LED strobe in a notification device, for all practical purposes must meet Underwriter's (UL®) standards that require certain levels of light output from strobe alarm units. In existing notification devices including LED strobes, high candela light output may range from 15 candela to 110 candela of more depending on the particulars of where they are installed. In at least some installations, increased light output higher than the standards require may be desirable, but is often not utilized due to increased power consumption that increased light output would entail if implemented in a conventional manner. This is particularly so when notification devices must also meet indirect viewing requirements Examples of inventive LED notification devices are described herein that provide for higher light output and meet indirect viewing requirements without increasing power consumption relative to a conventional LED notification device that otherwise meets the UL standard requirements. As explained in detail below, this is accomplished with non-uniform shaping of LED light pulses in a flashing strobe application. Controlled light pulses that define multiple distinct or discrete portions of a pulse having different illumination intensity and corresponding different light output levels are provided. Illumination of the LED during the pulse has multiple intensity levels that are maintained for subsequent time intervals in each pulse. While described in the context of a life safety application such as a fire safety warning system, the benefits of the invention may accrue more generally to devices for other applications, and as such the exemplary context of a fire safety application for the notification devices described is provided for the sake of illustration rather than limitation. Method aspects will be in part apparent and in part explicitly discussed in the following description.

Figure 1:
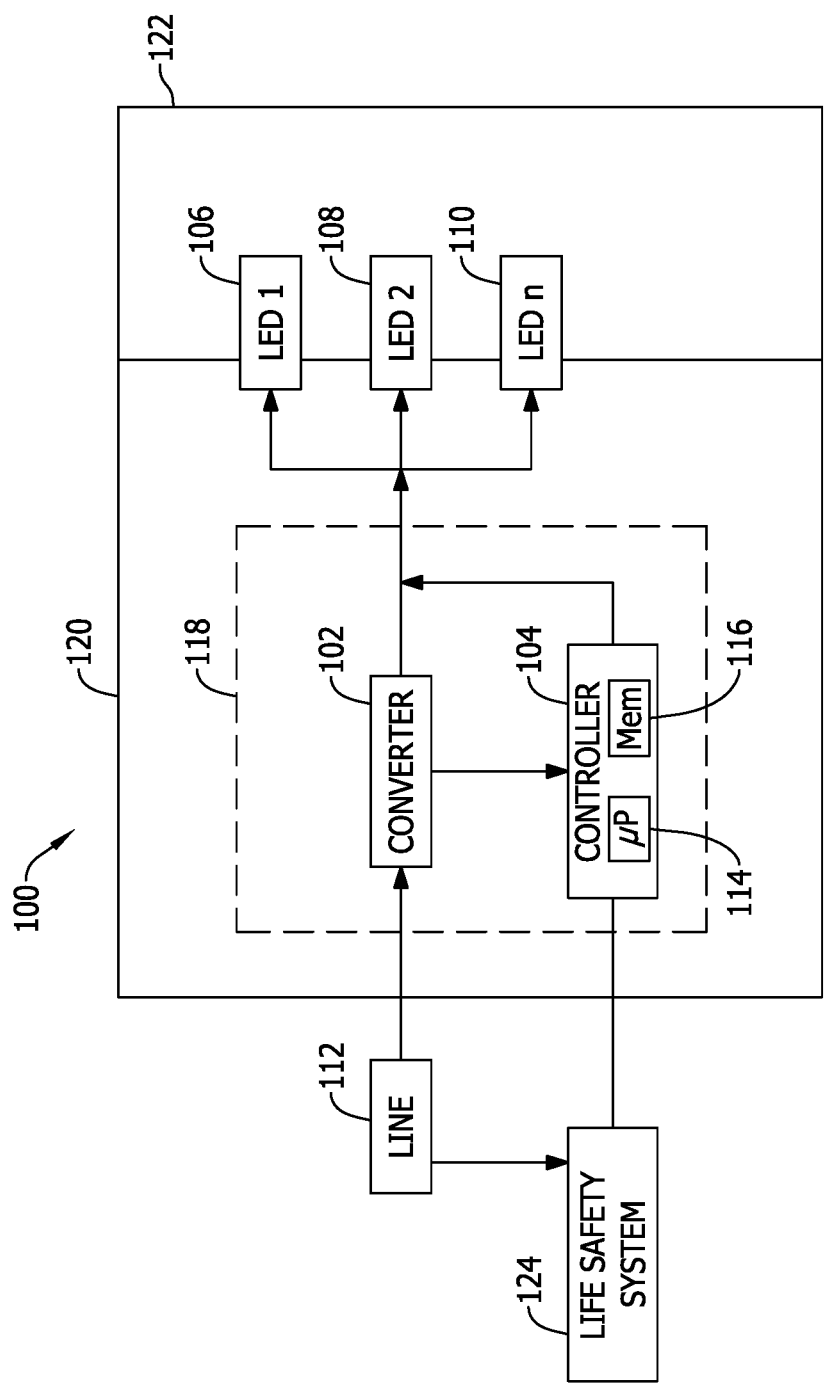
FIG. 1 is a block diagram of an exemplary notification device according to one embodiment of the present invention.

FIG. 1 is a block diagram of an exemplary notification device 100 according to one embodiment of the present invention. As shown in FIG. 1, the device 100 may include a converter 102 and a controller 104 providing a power output to a plurality of LEDs 106, 108, 110 representing n number of LEDs. While multiple LEDs are illustrated, it is recognized that multiple LEDs may not be required in all cases depending on the brightness of the LEDs utilized and particular end uses and related specifications.

The converter 102 receives electrical power from a power supply 112 indicated as line-side circuitry in FIG. 1. The power supply 112 may be a mains power supply for a building. In another embodiment, the power supply 112 may be a stand-alone power supply, and in some cases may be a battery power supply. In emergency applications, the power supply 112 may also include a back-up power supply such as an emergency generator, and in other embodiments the power supply may be an uninterruptable power supply. Regardless, the converter 102 converts or adapts the power supply 112 from a first form (i.e., a first current or voltage) to a second form (i.e., a second current or voltage) that is compatible with the controller 104 and/or the LEDs 106, 108, 110.

The controller 104 in the example shown receives power from the converter 102 and supplies a power output to the LEDs 106, 108, 110. The power output may be provided by the controller 104 with or without the aid of the converter 102. The controller 104 may be a processor-based microcontroller including a processor 114 and a memory storage 116 wherein executable instructions, commands, and control algorithms, as well as other data and information required to satisfactorily operate the LEDs 106, 108, 110 are stored. The memory 116 of the processor-based device may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based" microcontroller shall refer not only to controller devices including a processor or microprocessor as shown, but also to other equivalent elements such as microcomputers, programmable logic controllers, reduced instruction set (RISC) circuits, application specific integrated (ASIC) circuits and other programmable circuits, logic circuits, equivalents thereof, and any other circuit or processor capable of executing the functions described herein. The processor-based devices listed above are exemplary only, and are thus not intended to limit in any way the definition and/or meaning of the term "processor-based".

The controller 104 and the converter 102 may be collectively referred to as a control circuit 118, and it is recognized that in some cases the functionality of the converter 102 and the controller 104 may be combined into a single device as desired. Additional elements may be included in the control circuit 118 that are familiar to those in the art, including but not limited to energy storage elements such as capacitors, switches, etc. The construction of the control circuit 118 may be realized in different forms using known circuit techniques and known electronic devices familiar to those in the art. Accordingly the control circuit 118 will not be described further herein because constructing and implementing the control circuit 118, including any necessary programming that may apply, is generally within the purview and skill of those in the art.

The control circuit 118 and LEDs 106, 108 and 110 may be provided with a notification device housing 120, and the LEDs 106, 108 and 110 may be provided with a secondary optic element 122 such as a total internal reflection (TIR) lens and/or a reflector or plurality of reflectors. The housing 120 may be mounted on the wall or ceiling of a building in a known manner using known fasteners and techniques, with the housing 120 sized and shaped to be compatible with such fasteners and techniques for installation. During installation of the device 100, the control circuit 118 may likewise be connected to the power supply 112 using known connectors and techniques.

The LEDs 106, 108 and 110 may provide direct or indirect emergency lighting to alert persons in the facility of an emergency situation and permit them to take appropriate action such as evacuating the premises in which the device 100 is installed. LEDs 106, 108 and 110 may have the same or different color to provide different lighting effects, and secondary optic elements 122 including a total internal reflection (TIR) lens and/or a reflector or plurality of reflectors 122 of the same or different colors may likewise provide different lighting effects and achieve various lighting objectives. As LEDs 106, 108 and 110 and secondary optic elements 122 of various types and colors are well known and familiar to those in the art, they too will not described further herein.

The controller 104 and the control circuit 118 may be in communication with a life safety system 124. In a contemplated embodiment, the life safety system 124 is a fire safety warning system that is configured to activate the control circuit 118 when a fire is detected by the system 124 or when a fire alarm unit is activated by a person. When the control circuit 118 receives a predetermined signal, the LEDs 106, 108 and 110 can be activated in response. In various embodiments, the power supply 112 may be incorporated in the life safety system 124, or the life system 124 may be connected to a separate power supply 112. In other embodiments, other life safety systems besides fire alarms may be provided to activate the notification device 100 to address other types of emergencies. Systems other than life safety systems may likewise be provided to activate the LEDs for other purposes as desired. Numerous variations are possible in this regard.

Figure 2:
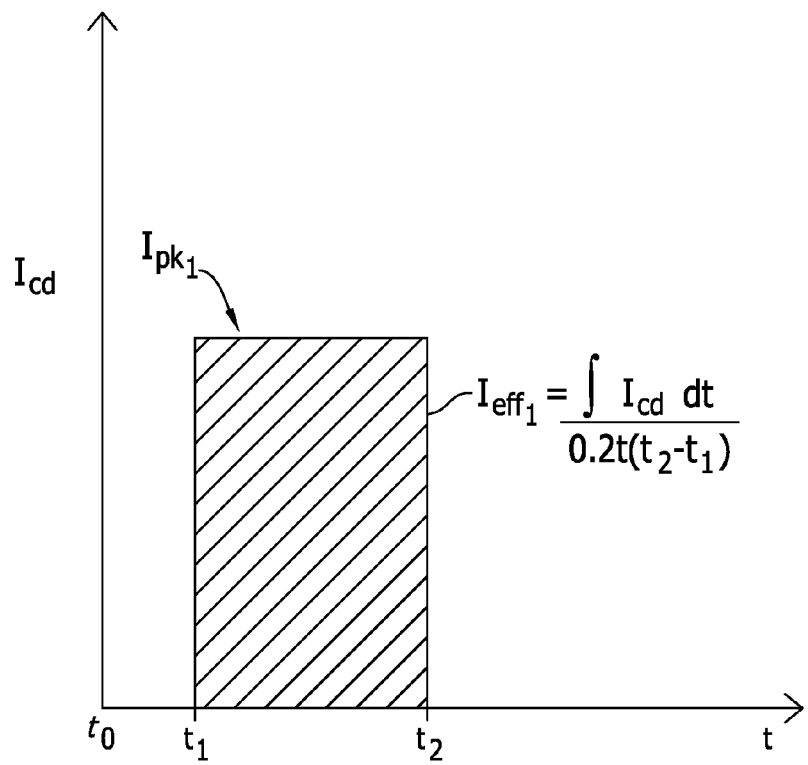
FIG. 2 illustrates a first light pulse graph for the notification device shown in claim 1.

FIG. 2 illustrates a first light pulse in graph form that is produced by the control circuit 118 and output to the LEDs 106, 108 and/or 110 in the notification device 100 shown in FIG. 1 when activated by the life safety system 124. In the example graph shown in FIG. 2, time t is represented along the x axis or horizontal axis while illumination intensity candela $I_{cd}$ is represented along the y axis or vertical axis. At time $t_0$, no output power is provided by the control circuit 118, the LEDs (106, 108 and/or 110) are not on and zero illumination is provided. In this state, the notification device 100 does not provide any direct or indirect lighting because the LEDs are off.

At time $t_1$, output power is provided by the control circuit 118, the LEDs 106, 108 and/or 110 are on and illumination of peak intensity $I_{pk1}$ is provided. In this state, the notification device 100 provides the desired direct or indirect lighting of the specified intensity equal to $I_{pk1}$. In contemplated embodiments, $I_{pk1}$ provides a specified effective candela to match the desired application for the notification device 100 at its point of installation. Specifically, the specified candela may range from about 15 candela to about 110 candela in contemplated embodiments, although higher and lower candela values are possible if desired in various other applications. As seen in FIG. 2, once $I_{pk1}$ is established, it remains constant and is uniformly applied for a specified period of time.

At time t2, no output power is provided by the control circuit 118, the LEDs (106, 108 and/or 110) are not on and zero illumination is provided. In this state, the notification device 100 ceases to provide direct or indirect lighting. The time interval between time $t_2$ and time $t_1$ defines a pulse width for the LEDs 106, 108, 110 in which they are turned on and remain on. A time between subsequent pulses defines a flash interval for the LEDS in which they are turned off and remain off.

At a time subsequent to time $t_2$ when the flash interval expires, which in contemplated embodiments is about equal to the interval between time $t_1$ and time $t_0$, output power is again provided by the control circuit 118, the LEDs (106, 108 and/or 110) are on and illumination of peak intensity $I_{pk1}$ is again provided and the pulse shown in FIG. 2 may be repeated. A series of pulses of constant intensity $I_{pk1}$ may be provided by the control circuit 118 in cyclic fashion, producing a flashing effect of a predetermined frequency such as about 1 Hz. The flashing provides direct lighting or indirect illumination on a visual surface to provide a visual alert to persons of an emergency situation.

As mentioned above, in certain installations pulses of higher intensity than $I_{pk1}$ may be desirable. If implemented in uniform pulses of constant illumination intensity like the pulse shown in FIG. 2, however, the notification device 100 will inevitably consume more power in use. In the general marketplace, a desire to avoid increased power consumption has generally overridden any desire for increased intensity of the LED strobe-type lighting described, and as such increased intensity of lighting for the notification device 100 has generally not been adopted.

Figure 3:
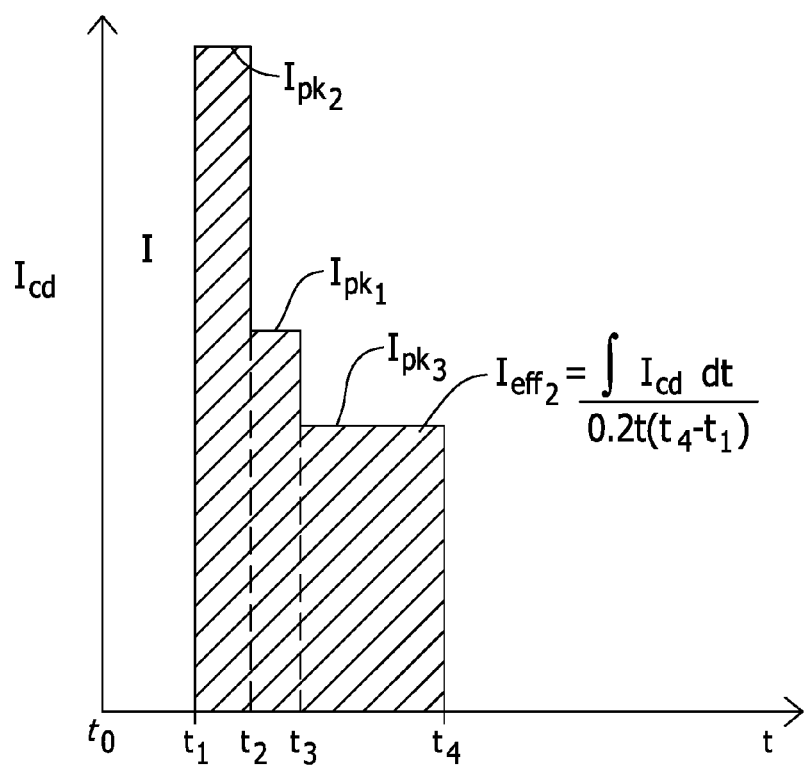
FIG. 3 illustrates a second light pulse graph for the notification device shown in claim 1.

FIG. 3 illustrates a second light pulse graph for the notification device 100 that balances a desire for additional illumination intensity to meet indirect viewing requirements with a desire to limit power consumption. In actual use of the notification device 100, persons may beneficially visually detect illumination that is viewed indirectly or in the far-peripheral field of view instead of actually looking directly at the notification device 100 to see illuminated LEDs. In particular, observers may see or perceive the change in illuminance on a visual surface such as a wall surface rather than the flashing light itself when it is not in the central field of view. Recognizing this, the notification device 100 is designed to enhance such an indirect viewing capability.

Specifically, the second light pulse graph may be created and implemented by the control circuit 118 in reference to the pulse shown in FIG. 2 to improve the illumination intensity and indirect viewing capability to observers without consuming additional power. In other words, the pulse shown in FIG. 3 is strategically selected and optimized to provide optimal illumination while maintaining the power consumption of the reference pulse shown in FIG. 2.

As illustrated in FIG. 3, at time $t_0$ no output power is provided by the control circuit 118, the LEDs (106, 108 and/or 110) are not on and zero illumination is provided. In this state, the notification device 100 does not provide any direct or indirect lighting.

At time $t_1$, output power is provided by the control circuit 118, the LEDs (106, 108 and/or 110) are on and illumination of peak intensity $I_{pk2}$ is provided. In this state, the notification device 100 provides the desired direct or indirect lighting of the specified intensity equal to $I_{pk2}$. As a comparison of FIGS. 2 and 3 reveals, $I_{pk2}$ is greater than $I_{pk1}$ and a higher intensity illumination is accordingly provided. The higher intensity illumination improves a perceived indirect viewing of illumination by observers relative to the pulse shown in FIG. 2. The illumination of peak intensity $I_{pk2}$ is maintained for a time interval between time $t_1$ and time $t_2$.

At time $t_2$, output power is adjusted and reduced by the control circuit 118 such that the LEDs (106, 108 and/or 110) remain on but are illuminated with a comparatively smaller intensity that is approximately equal to $I_{pk1}$ shown in FIG. 2. In this state, the notification device 100 provides the desired direct or indirect lighting of the specified intensity equal to $I_{pk1}$. The illumination of comparatively smaller intensity of $I_{pk1}$ is maintained for a time interval between time $t_2$ and time $t_3$. The interval between time $t_2$ and time $t_3$ is about equal to the interval between time $t_1$ and time $t_2$ in the example shown.

At time $t_3$, output power is again adjusted and reduced by the control circuit 118 such that the LEDs (106, 108 and/or 110) remain on but are illuminated with a comparatively smaller intensity that is approximately equal to $I_{pk3}$. In this state, the notification device 100 provides the desired direct or indirect lighting of the specified intensity equal to $I_{pk3}$ that is less than $I_{pk1}$ and $I_{pk2}$. The illumination of the lowest intensity of $I_{pk3}$ is maintained for a time interval between time $t_3$ and time $t_4$. The interval between time $t_3$ and time $t_4$ is longer than the intervals between time $t_1$ and time $t_2$ or between time $t_2$ and time $t_3$ in the example shown.

At time $t_4$, no output power is provided by the control circuit 118, the LEDs (106, 108 and/or 110) are not on and zero illumination is provided. In this state, the notification device 100 ceases to provide direct or indirect lighting. Comparing FIGS. 2 and 3, it can be seen that time $t_4$ in FIG. 3 corresponds to time $t_2$ in FIG. 2. As such, the pulses represented in FIGS. 2 and 3 have an equal time duration from start to finish.

At a time subsequent to time $t_4$, output power is again provided by the control circuit 118, and the LEDs (106, 108 and/or 110) receive another pulse similar to that shown in FIG. 3. A series of pulses of non-uniform intensity including the levels $I_{pk2}$, $I_{pk1}$ and $I_{pk3}$ are therefore provided in cyclic fashion. Time periods between successive pulses wherein the LEDs are not illuminated is small enough that the flashing of the LEDs is not perceptible to the human eye. The flashing of the LEDs contributes to the reduced power consumption utilized by the notification device 100 when activated.

The light pulse shown in FIG. 3 provides enhanced instantaneous illumination of the notification device 100 to provide direct or indirect emergency lighting application without increasing power consumption of the device 100 when activated. The non-uniform shape of the pulse shown in FIG. 3, as opposed to the uniform pulse shape shown in FIG. 2 provides improved indirect viewing capability in the notification device 100, but with the same effective candela rating as the pulse shown in FIG. 2.

The equal power consumption of the two pulses shown in FIGS. 2 and 3 may be recognized when considering that the light output of fire strobes is measured in effective candela $I_{eff}$. As those in the art will no doubt appreciate, $I_{eff}$ is calculated by integrating instantaneous candela over flash period. The graphs in FIGS. 1 and 2 show two different light pulse flashes with different shapes but having the same $I_{eff}$. Each of these (indicated as $I_{eff}$ in FIG. 2 and $I_{eff}$ in FIG. 3) have a value as shown that is equal to the following relationships:

$$I_{eff1} = \frac{\int I_{cd} dt}{0.2 + (t_2 - t_1)} \quad (1)$$

$$I_{eff2} = \frac{\int I_{cd} dt}{0.2 + (t_4 - t_1)} \quad (2)$$

Since $I_{cd}dt$ is proportional to electrical energy and also since the time intervals between $t_2$ and $t_1$ in FIG. 2 is the same as the internal between $t_4$ and $t_1$ in FIG. 3, the relationships (1) and (2) represent alternative expressions of the same value, and the two graphs of the pulses shown in FIGS. 2 and 3 therefore represent equivalent power.

The pulse shown in FIG. 3 has an additional potential additional benefit in that the peak candela is higher for part of the pulse width than for the remainder of the pulse width. This higher instantaneous peak when reflected off of a wall may provide increased indirect viewing alerting ability to building occupants during an emergency.

It should now be evident that variations of the pulse shown in FIG. 3 can be made to produce an equal result but with different levels of low intensity $I_{pk3}$, intermediate intensity $I_{pk1}$, and high intensity $I_{pk2}$. For example, the magnitude of high intensity $I_{pk2}$ may be increased so long as the magnitude of low intensity $I_{pk3}$ and/or intermediate intensity $I_{pk1}$ are reduced to offset the increased magnitude of high intensity $I_{pk2}$ and maintain the same power consumption as before. A pulse of different proportions than that shown in FIG. 2 may therefore be provided that produce a different lighting effect than the reference pulse shown in FIG. 2 but without increasing the power consumption relative to the pulse shown in FIG. 2.

It should likewise be evident that variations of the pulse shown in FIG. 3 can be made to produce an equal result but with different sequences of low intensity $I_{pk3}$, intermediate intensity $I_{pk1}$, and high intensity $I_{pk2}$. For example, in another embodiment, the high intensity $I_{pk2}$ may be realized after the low intensity $I_{pk3}$ and/or intermediate intensity $I_{pk1}$ are realized. It should be understood, however, that if the high intensity $I_{pk2}$ is not presented first the notification device in certain applications may fail to meet any applicable instantaneous illumination requirements. As instantaneous illumination requirements are not strictly required in all applications, however, variations are possible. Differently shaped pulses than the example of FIG. 3 may therefore be provided that produce a different lighting effect than the reference pulse shown in FIG. 2 but without increasing the power consumption relative to the pulse shown in FIG. 2.

Further variations of the pulse shown in FIG. 3 may include different numbers of intensity levels. For example, the intermediate intensity $I_{pk1}$ could be considered optional and may be omitted, although if this was done either of the high intensity $I_{pk2}$ or the low intensity $I_{pk3}$ would need to be adjusted to keep the same power consumption as before. Likewise, a fourth intensity level may be introduced if desired. So long as the power consumption is unchanged, as many intensity levels as desired may be introduced. Numerous variations and lighting effects may be realized in this regard. Adding and subtracting illumination intensity levels and varying the time intervals for each intensity level provided affords yet another way to provide a differently shaped pulses than the example of FIG. 3 to produce a different lighting effect than the reference pulse shown in FIG. 2 but without increasing the power consumption relative to the pulse shown in FIG. 2

Finally, variations of the pulses described in relation to FIGS. 2 and 3 may be utilized in combination if desired to produce other lighting effects without altering power consumption. For example, alternating pulses such as those shown in FIGS. 2 and 3 could be implemented. The use of even and unevenly shaped profiles in a desired sequence may produce still other lighting effects that are not easily realized, if they can be realized at all, using conventional strobe lighting techniques that are constrained by existing power consumption requirements.

Having now described the shaped pulse concept in relation to FIG. 3, those in the art may create or select a non-uniform pulse shape such as that described and construct a control circuit to produce it without further explanation. Any programming of a controller may be accomplished using appropriate algorithms and the like to provide the desired effects.

Figure 4:
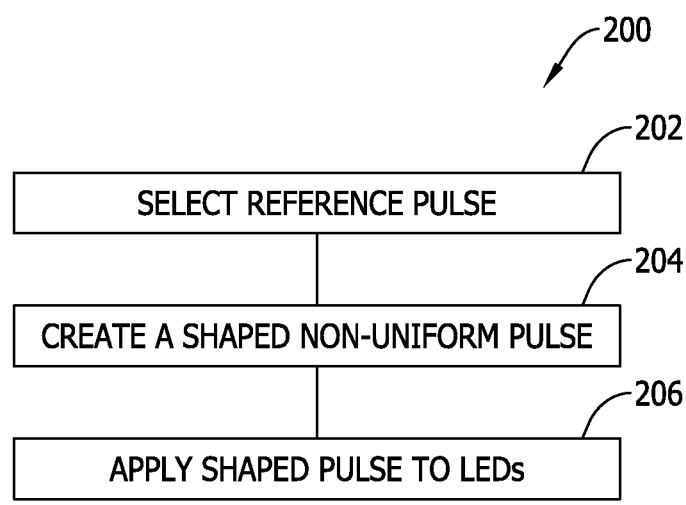
FIG. 4 is an exemplary flowchart of a method for controlling and operating the notification device shown in FIG. 1 with a light pulse such as that shown in FIG. 3.

FIG. 4 briefly illustrates a method 200 of controlling and operating a notification device including an LED strobe adopting the teachings above.

At step 202, a reference pulse such as that shown in FIG. 2 having a uniform shape is selected.

At step 204, a non-uniform pulse is created and shaped to produce a desired effect without increasing power consumption relative to the reference pulse selected at step 202. The non-uniform pulse shape may be defined by a number of lighting intensity values such as those described above that are maintained for successive portions of a flash interval. In use, the non-uniform pulse shape causes the LEDs to be illuminated with different light output in different portions of each flash interval, while maintaining the same power consumption as the reference pulse in use.

At step 206, the shaped pulse created at step 204 is applied to the LEDs in the notification device using a control circuit such as the circuit 118 described above. The application of the shaped pulse at step 206 may include an associated step of receiving a signal from the life safety system 124 described above. In this context, the shaped pulse may be applied only when the control circuit 118 is activated by the life safety system 124.

Using the described methodology, a full line of notification devices can be provided having different light outputs and lighting effects to meet a full range of specifications to complete a life safety system application.

The benefits and advantages of the inventive concepts disclosed are now believed to have been amply illustrated in relation to the exemplary embodiments described.

An embodiment of a notification device strobe has been disclosed including: a control circuit and at least one light emitting diode (LED) operable with the control circuit. The control circuit is configured to provide a non-uniform pulse shape output to the at least one LED.

Optionally, the non-uniform pulse shape output includes at least one pulse portion having a first illumination intensity and a at least one pulse portion having a second illumination intensity, wherein the first illumination intensity is greater than the second illumination intensity. The non-uniform pulse shape output may also include a third pulse portion having a third illumination intensity, the second illumination intensity greater than the third illumination intensity.

The non-uniform pulse shape output may optionally include multiple and different illumination intensity values. The multiple different illumination intensities may begin with a high intensity value, the high intensity value being maintained for a first predetermined time. The high intensity value may have a magnitude that is selected to meet an indirect viewing requirement. The illumination intensity values may include an intermediate intensity value being maintained for a second predetermined time after expiration of the first predetermined time. The first and second predetermined times may be equal to one another. The illumination intensity values may include a low intensity value being maintained for a third predetermined time after expiration of the second predetermined time. The third predetermined time may be larger than the first or second predetermined times.

As further options, the non-uniform pulse shape may include at least first and second intensity levels that are different from one another, and when applied the non-uniform pulse shape may consume an equal amount of power to a reference pulse having a uniform pulse shape that provides a specified effective candela rating. The notification device strobe may include a housing configured to be mounted to a wall or ceiling. The notification device strobe may also include a secondary optic element associated with the at least one LED.

Another embodiment of a notification device strobe has also been disclosed including: a housing configured to be mounted to a wall or ceiling; a control circuit connectable to a power supply; and at least one light emitting diode (LED) associated with the housing and operable with the control circuit; wherein the control circuit is configured to provide a non-uniform pulse shape output to the at least one LED, the non-uniform pulse shape defined by a combination of different illumination intensity values that when applied consume an equal amount of power to a reference pulse having a uniform pulse shape that provides a specified effective candela rating.

Optionally, the non-uniform pulse shape may include at least a first portion having a first illumination intensity value higher than a uniform intensity value of the reference pulse. The non-uniform pulse shape may also include a second portion having a second illumination intensity value, the second illumination intensity value being lower than the first intensity value. The non-uniform pulse shape may also include a third portion having a third illumination intensity value, the third illumination intensity value being lower than the second intensity. At least two of the first, second and third portions may be maintained for different amounts of time in the non-uniform pulse shape.

A method of operating a notification device strobe has also been disclosed including: creating a non-uniform pulse power output shape that is configured to consume an equal amount of power to a uniform pulse power output of a specified effective candela rating when applied to at least one light emitting diode (LED); and applying the non-uniform pulse power output shape to at least one light emitting diode (LED) with a control circuit to provide direct or indirect emergency lighting on a visual surface.

Optionally, applying the non-uniform pulse power output shape may include: applying a high intensity value in a first portion of the non-uniform power output shape for a first time duration; applying an intermediate intensity value in a second portion of the non-uniform power output shape for a second time duration; and applying a low intensity value in a third portion of the non-uniform power output shape for a third time duration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A notification device comprising:
 a strobe light comprising:
  a control circuit; and
  at least one light emitting diode (LED) operable with the control circuit;
  wherein the control circuit is configured to provide a non-uniform pulse shape output to the at least one LED in a flashing strobe application;
  wherein the non-uniform pulse shape includes at least first and second intensity levels that are different from one another, and when applied the non-uniform pulse shape consumes an equal amount of power to a reference pulse having a uniform pulse shape that provides a specified effective candela rating.

2. The notification device of claim 1, wherein the non-uniform pulse shape output further includes a third illumination intensity level different from the first and second intensity levels.

3. The notification device of claim 1, wherein the non-uniform pulse shape output begins with a pulse portion having a high intensity level, the high intensity level being maintained for a first predetermined time.

4. The notification device of claim 3, wherein the high intensity value has a magnitude that is selected to meet an indirect viewing requirement.

5. The notification device of claim 3, wherein the non-uniform pulse shape output includes a pulse portion having an intermediate intensity value being maintained for a second predetermined time after expiration of the first predetermined time.

6. The notification device of claim 5, wherein the first and second predetermined times are equal to one another.

7. The notification device of claim 6, wherein the third predetermined time is larger than the first or second predetermined times.

8. The notification device of claim 5, wherein the non-uniform pulse shape output further includes a pulse portion having a low intensity value being maintained for a third predetermined time after expiration of the second predetermined time.

9. The notification device of claim 1, further comprising a housing, the housing configured to be mounted to a wall or ceiling.

10. The notification device of claim 1, further comprising a secondary optic element associated with the at least one LED.

11. A notification device strobe comprising:
 a housing configured to be mounted to a wall or ceiling;
 a control circuit connectable to a power supply; and
 at least one light emitting diode (LED) associated with the housing and operable with the control circuit;
 wherein the control circuit is configured to provide a non-uniform pulse shape output to the at least one LED in a flashing strobe application, the non-uniform pulse shape defined by a combination of different illumination intensity values that when applied consume an equal amount of power to a reference pulse having a uniform pulse shape that provides a specified effective candela rating.

12. The notification device strobe of claim 11, wherein the non-uniform pulse shape includes at least a first portion having a first illumination intensity value higher than a uniform intensity value of the reference pulse.

13. The notification device strobe of claim 12, wherein the non-uniform pulse shape further comprise a second portion having a second illumination intensity value, the second illumination intensity value being lower than the first intensity value.

14. The notification device strobe of claim 13, wherein the non-uniform pulse shape further comprises a third portion having a third illumination intensity value, the third illumination intensity value being lower than the second intensity.

15. The notification device strobe of claim 14, wherein at least two of the first, second and third portions are maintained for different amounts of time in the non-uniform pulse shape.

16. A method of operating a notification device in a flashing strobe application, the method comprising:
 creating a non-uniform pulse power output shape that is configured to consume an equal amount of power to a uniform pulse power output of a specified effective candela rating when applied to at least one light emitting diode (LED) in the flashing strobe application; and
 applying the non-uniform pulse power output shape to at least one light emitting diode (LED) with a control circuit to provide direct lighting or indirect emergency lighting on a visual surface.

17. The method of claim 16, wherein applying the non-uniform pulse power output shape comprises:
 applying a high intensity value in a first portion of the non-uniform power output shape for a first time duration;
 applying an intermediate intensity value in a second portion of the non-uniform power output shape for a second time duration; and
 applying a low intensity value in a third portion of the non-uniform power output shape for a third time duration.

* * * * *